United States Patent
Broyer et al.

(10) Patent No.: US 7,587,977 B2
(45) Date of Patent: Sep. 15, 2009

(54) PYROTECHNIC MICROSYSTEM AND METHOD FOR FABRICATING A MICROSYSTEM

(75) Inventors: Patrick Broyer, Saint Cassien (FR); Bruno Colin, Marcy l'Etoile (FR); Denis Roller, La Ferté Alais (FR)

(73) Assignees: Biomerieux, Marcy l'Etoile (FR); SNPE Materiaux Energetiques, Paris (FR)

( * ) Notice: Subject to any disclaimer, the term of this patent is extended or adjusted under 35 U.S.C. 154(b) by 344 days.

(21) Appl. No.: 10/585,356

(22) PCT Filed: Jan. 20, 2005

(86) PCT No.: PCT/FR2005/050034

§ 371 (c)(1),
(2), (4) Date: Jul. 6, 2006

(87) PCT Pub. No.: WO2005/075835

PCT Pub. Date: Aug. 18, 2005

(65) Prior Publication Data

US 2008/0041259 A1 Feb. 21, 2008

(30) Foreign Application Priority Data

Jan. 27, 2004 (FR) .................................. 04 00720

(51) Int. Cl.
*F15B 15/19* (2006.01)

(52) U.S. Cl. .............. 102/202.11; 102/202.5; 102/202.6; 102/202.14; 102/335; 102/275.11

(58) Field of Classification Search .............. 102/202.5, 102/202.6, 202.7, 202.8, 202.9, 202.11, 205, 102/275.11, 202.14, 335; 280/736, 741
See application file for complete search history.

(56) References Cited

U.S. PATENT DOCUMENTS

| 6,641,074 | B2 * | 11/2003 | Shih et al. .................... 242/374 |
| 6,994,030 | B2 * | 2/2006 | Perut et al. ................ 102/202.5 |
| 7,134,445 | B2 * | 11/2006 | Broyer et al. ............. 137/68.13 |
| 7,159,618 | B2 * | 1/2007 | Broyer et al. ................ 137/828 |
| 7,270,059 | B2 * | 9/2007 | Roller et al. ............. 102/202.5 |
| 2002/0088890 | A1 | 7/2002 | Shih et al. |

FOREIGN PATENT DOCUMENTS

| EP | 1 344 744 A1 | 9/2003 |
| WO | WO 98/22719 A1 | 5/1998 |
| WO | WO 02/088551 A1 | 11/2002 |

OTHER PUBLICATIONS

Rossi et al., "Realization, characterization of micro pyrotechnic actuators and FEM modeling of the combustion ignition," Sensory and Actuators A, 70 pp. 141-147, 1998.

* cited by examiner

*Primary Examiner*—James S Bergin
(74) *Attorney, Agent, or Firm*—Oliff & Berridge, PLC

(57) ABSTRACT

The invention relates to a microsystem and a method for fabricating a microsystem. The pyrotechnic microsystem (7, 1') comprises a substrate having at least two separate electrical initiation zones, each of which provides separate electrical initiation of a pyrotechnic material deposited on the substrate. This microsystem (7, 1') is characterized in that the same pyrotechnic material deposit (721, 721', 13) covers both initiation zones, said deposit (721, 721', 13) produced on the substrate having a thickness sufficiently small for the initiation of the pyrotechnic material in the initiation zone to remain localized and not propagate to the other initiation zone, but sufficient to generate a specific gas quantity.

18 Claims, 2 Drawing Sheets

Figure 1:
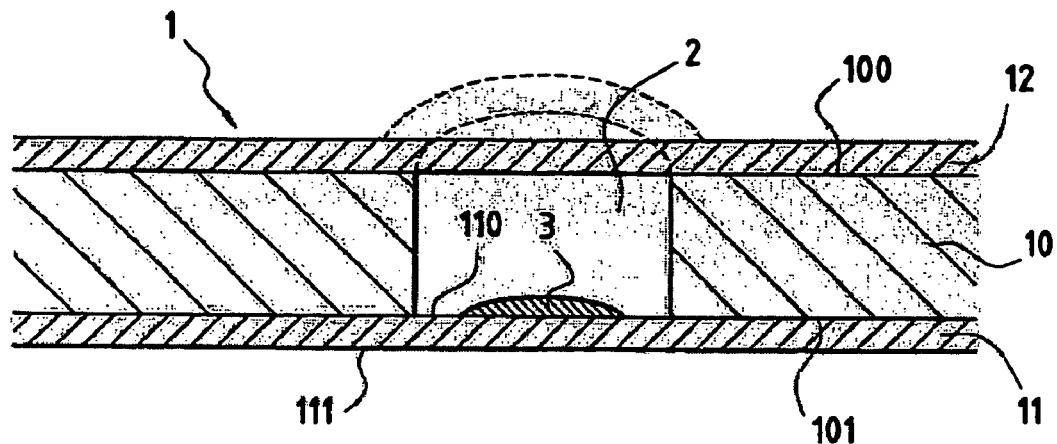

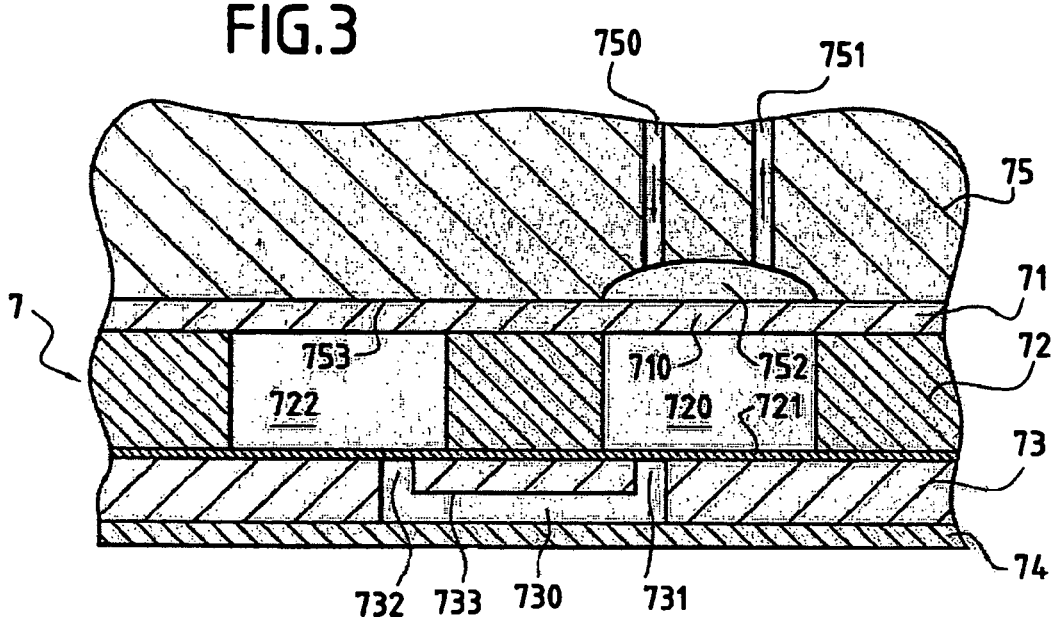
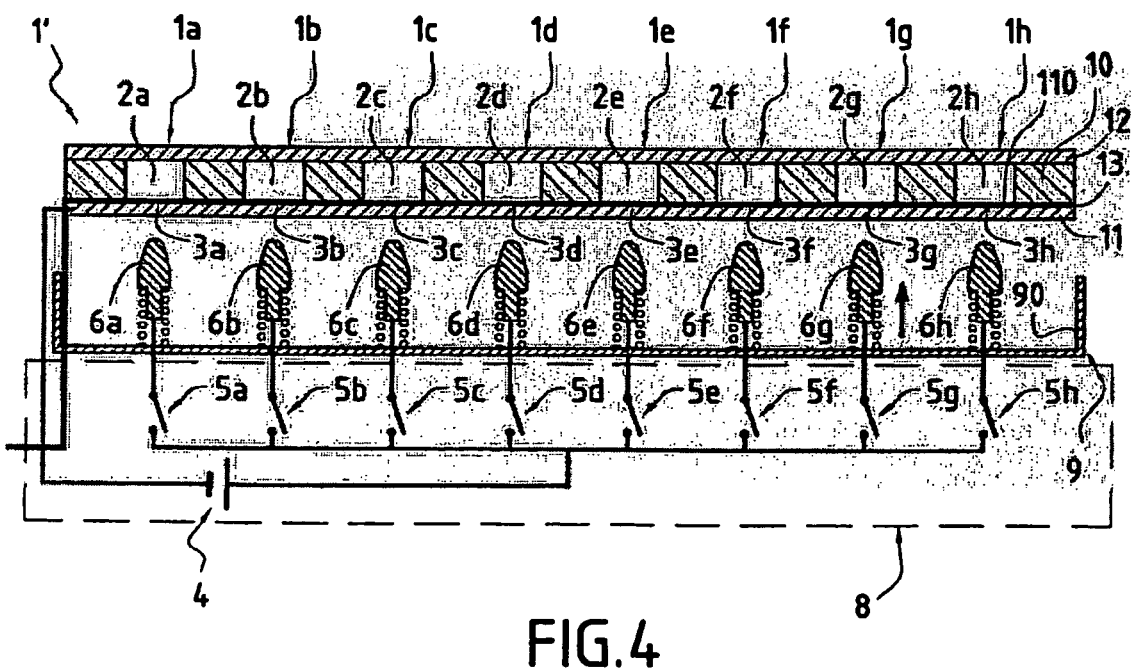

PYROTECHNIC MICROSYSTEM AND METHOD FOR FABRICATING A MICROSYSTEM

The technical field of the invention is that of microsystems in which microactuators are intended to fulfill mechanical, chemical, electrical, thermal or fluidic functions, for microelectronic applications such as chips, biomedical applications such as analysis cards integrating microfluidics or chemical synthesis applications such as microreactors.

Microactuators are miniaturized objects having dimensions of the order of one millimeter. They are produced in solid supports which may be semiconducting or insulating, with a view to forming microsystems such as, for example, microvalves or micropumps in fluid microcircuits, or microswitches in electronic microcircuits.

Microactuators using electrostatic, piezoelectric, electromagnetic and bimetallic effects have already existed for some time. A new generation of microactuators is starting to make its appearance: those utilizing the pyrotechnic effect. Since pyrotechnic materials have a high energy density, their use in microactuators therefore makes it possible to considerably reduce the size of the microsystems integrating such microactuators. Such pyrotechnic microactuators are described, for example, in Patent Application WO 02/088551.

In this patent application, the operation of a pyrotechnic microactuator is obtained by causing the combustion of a pyrotechnic micro-charge, generally by locally raising its temperature to a decomposition threshold by means of an initiation device. The gases generated by the combustion of the pyrotechnic micro-charge have a specific effect. As in the aforementioned application, this effect may for example consist in deforming a membrane which delimits the combustion chamber of the pyrotechnic micro-charge. In a specific microsystem, for example in a microvalve, this membrane will for example have the function of closing a fluid circuit between two canals by deforming. The number of microactuators used in a microsystem may be very high and amount to several hundreds.

In general, the pyrotechnic micro-charge is placed in contact with initiation means. This is the case in the aforementioned Patent Application No. WO 02/088551, but also the case in Patent Application WO 98/22719. In this Application WO 98/22719, the pyrotechnic micro-charge is deposited between two metallic contacts on a support of a printed circuit, via which the initiation current of the pyrotechnic charge is supplied. A surface resistance less extended than that of the charge is deposited on the pyrotechnic charge to be initiated, and connects the two metallic contacts.

For correct operation of a microactuator or a microsystem, it has been found that the quantity of pyrotechnic material burnt during operation should be controlled. This may clearly be done by controlling on the one hand the quantity of pyrotechnic material used, and on the other hand the positioning of the pyrotechnic deposit with respect to the initiation means. Controlling these two parameters may however prove difficult and constraining, particularly in the event that the microsystems are industrially fabricated at a high rate. This is because the positioning of the deposits on their support depends in particular on the production tolerances of the support, the positioning tolerances of this support on the deposition machine and the tolerances of the machine itself. On miniaturized objects such as microsystems, an error in the positioning of the pyrotechnic substance with respect to its initiation means may lead to a malfunction.

It is therefore an object of the invention to be able to overcome the difficulties and constraints in the fabrication of a microsystem having a plurality of pyrotechnic substance deposits.

This object is achieved by a pyrotechnic microsystem comprising a substrate having at least two separate electrical initiation zones of a pyrotechnic material deposited on the substrate, characterized in that the same pyrotechnic material deposit covers both initiation zones, said deposit produced on the substrate having a thickness sufficiently small for the initiation of the pyrotechnic material at one initiation zone to remain localized and not propagate to the other initiation zone, but sufficient to generate a specific gas quantity.

According to the invention, the constraint of having to obtain a deposit perfectly localized at the initiation zone is therefore eliminated. Industrial production can therefore be facilitated, and will be less dependent on the various tolerances of the machines involved in fabrication.

According to one feature, the pyrotechnic material deposit is produced with a thickness of less than 100 μm. With such a thickness, the pyrotechnic material can be deposited in a full layer and the combustion around an initiation zone on this deposit will not propagate beyond it to the adjacent initiation zone.

According to another feature, the substrate is produced from an assembly of superimposed layers.

According to another feature, the pyrotechnic material deposit constitutes one of the superimposed layers. According to the invention, the industrial production of such a microsystem is facilitated because it is sufficient to superimpose successive layers. The positioning constraints of the pyrotechnic deposit with respect to the various initiation zones are greatly reduced.

According to another feature, the pyrotechnic material deposit is used as an adhesive for assembly between a layer lying above said deposit and a layer lying below said deposit.

According to another feature, the deposited pyrotechnic material is in the form of a nitrocellulose-based varnish.

According to another feature, the varnish is deposited with a thickness of between 5 and 40 μm after drying.

According to another feature, each of the initiation zones can be produced from an electrical resistance on the substrate.

According to another feature, each of the initiation zones can be produced at the point of contact of a conductive finger connected to an electrical generator on the substrate made of metallic substance, which is also connected to said generator.

According to another feature, the microsystem comprises a deformable membrane partially delimiting a combustion chamber intended to receive the gases generated by at least one part of the pyrotechnic material deposit in contact with one of the initiation zones.

According to another feature, the microsystem comprises a layer through which an orifice forming the combustion chamber is formed, said layer being held between the membrane, itself forming a layer, and the pyrotechnic substance deposit.

It is another object of the invention to provide a method for fabricating a microsystem such as that presented above.

This object is achieved by a method for fabricating a microsystem comprising a plurality of adjacent microactuators established on a substrate, each microactuator being capable of having a specific effect owing to the gases generated by the combustion of a pyrotechnic material initiated from an electrical initiation zone associated with each microactuator, characterized in that a pyrotechnic material layer common to all the microactuators is deposited on the substrate with a thickness sufficiently small for the initiation of the pyrotechnic substance in one initiation zone to remain localized and not propagate to the other initiation zone, but sufficient to generate a specific gas quantity.

According to one feature, the method consists only in stacking superimposed layers, the pyrotechnic material layer constituting one of the layers of the stack.

According to another feature, the pyrotechnic material layer is deposited with a thickness of less than 100 μm.

According to another feature, the pyrotechnic material layer is deposited by coating, screen printing, pad printing, immersion or by spraying.

The invention with its characteristics and advantages will become more readily apparent on reading the description given with reference to the appended drawings, in which:

FIG. 1 schematically represents an axial longitudinal section of a microactuator.

Figure 2:
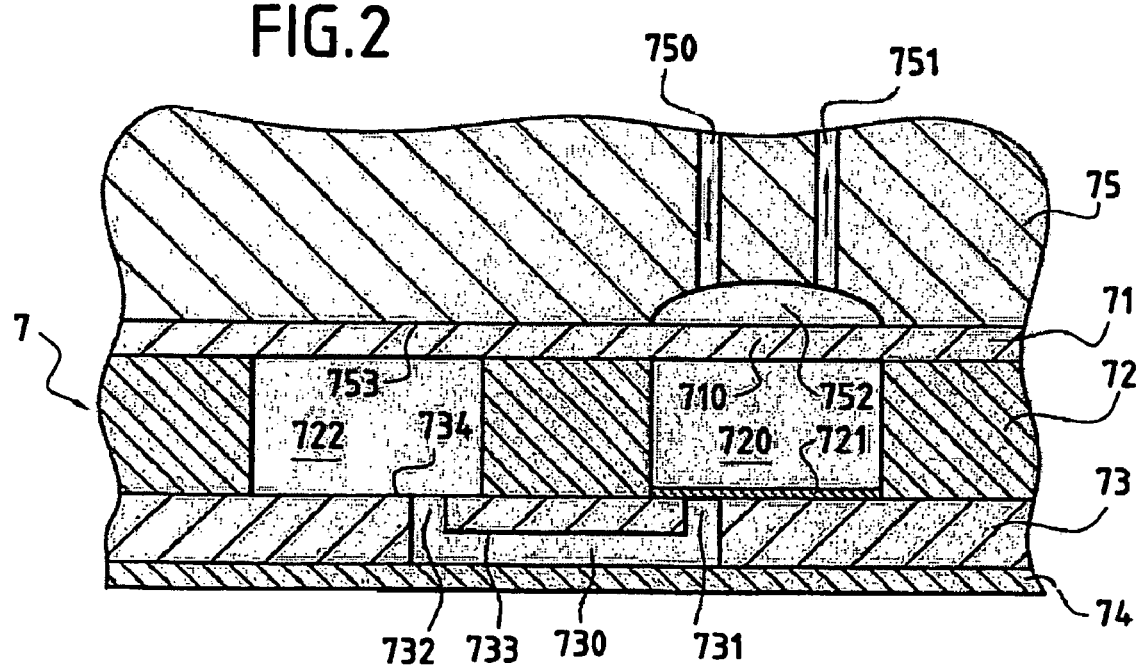

FIG. 2 schematically represents an axial longitudinal section of a microvalve, in which a microactuator makes it possible to produce a closing/opening cycle of the fluidic circuit.

FIG. 3 schematically represents a microvalve according to another embodiment.

FIG. 4 schematically represents an axial longitudinal section of a microsystem composed of a plurality of microactuators, onto which an electrical initiation device will be fitted.

Throughout the description, the expressions "pyrotechnic substance" and "pyrotechnic material" have the same meaning.

The invention will now be described in conjunction with FIGS. 1 to 4.

Referring to FIG. 1, a pyrotechnic microactuator 1 typically comprises a chamber 2, for example of cylindrical shape, produced in a polycarbonate support. Said support is obtained, for example as represented in FIG. 1, from a stack of sheets or layers assembled on one another, for example by adhesive bonding, laser welding or thermocompression, hot rolling or any other suitable means. A simple pyrotechnic microactuator 1 such as that represented in FIG. 1 comprises three superimposed layers 10, 11, 12. The central layer 10 is pierced transversely with a hole which is covered by the so-called upper layer 12 fixed on a first face of the central layer, referred to as the upper face 100, and by the so-called lower layer 11 fixed on the face opposite the upper face 100 of the central layer 10, referred to as the lower face 101. With the upper layer 12 and the lower layer 11, the side walls of this hole therefore delimit the so-called combustion chamber 2. The diameter of the combustion chamber 2 formed in this way is for example 1 mm. A pyrotechnic micro-charge 3 is placed in this combustion chamber 2. The chamber 2 preferably defines a hermetic space.

The upper layer 12 consists of a deformable membrane assembled on the upper face 100 of the central layer 10. This membrane will for example be made of a plastic and/or elastic material, for example PTFE (or Teflon, registered trademark), rubber, elastomer, PVDC (polyvinylidene chloride) or PVDF (polyvinylidene fluoride).

According to the invention, the pyrotechnic micro-charge 3 is deposited in the combustion chamber 2 on the face of the lower layer 11 which is in contact with the central layer 10. This face of the conductive layer 11 is referred to as the upper face 110. The pyrotechnic micro-charge 3 may be deposited for example in the form of a film, for example a discoid film, having a thickness of between 1 μm and 100 μm.

The mode of operation of this microactuator 1 is as follows. An electrical current is delivered into an initiation means forming an initiation zone which consists, for example, of a conductive heating track having a resistive part or a resistive heating wire. The temperature in this initiation means rises until it reaches the ignition temperature of the pyrotechnic composition 3. The combustion of said composition 3 leads to gas production, which creates a positive pressure in the chamber 2. The membrane 12 which is thus stressed reacts by deforming.

FIG. 2 represents an improved microactuator 7 making it possible to obtain a deformation of the membrane, as described above with reference to FIG. 1, and also a reduction of this deformation. In FIGS. 2 and 3, this microactuator 7 acts as a microvalve in a fluid microcircuit. The microactuator 7 consists of four superimposed layers 71, 72, 73 and 74, referred to respectively as the first layer, second layer, third layer and fourth layer. The second, third and fourth layers 72, 73, 74 constitute the support and are made for example of polycarbonate. The first layer 71 is made of a plastic and/or elastic material, for example Teflon (registered trademark), latex, PVDC (polyvinylidene chloride) or PVDF (polyvinylidene fluoride). A fifth layer 75, constituting the fluid microcircuit, is present on the first layer 71 of the microactuator 7. This fifth layer 75 consisting of the fluid microcircuit is crossed transversely by two canals 750 and 751. The two canals 750 and 751 comprise an end opening into a recess 752 formed on the face 753 of this fifth layer 75, referred to as the lower face, lying next to the first layer 71 of the microactuator 7. The two canals 750 and 751 therefore communicate via the recess 752. A first canal 750 constitutes for example a fluid feed to the recess 752, and the second canal 751 constitutes a fluid outlet from the recess 752. The assembly consisting of the microactuator 7 and the fluid microcircuit forms a microsystem.

The first layer 71 of the microactuator 7 constitutes a deformable membrane 710 such as that described under the reference 12 in FIG. 1. Since the membrane 710 is fixed on the lower face 753 of the fifth layer 75, for example by adhesive bonding, deformation of the membrane 710 is possible only in the recess 752 of the fifth layer 75.

The second layer 72 consists of a sheet pierced transversely with two holes and having a thickness for example equal to 0.5 mm. With the first layer 71 lying above and with the third layer 73 lying below, the side walls of a first hole delimit the main combustion chamber 720 of the microactuator.

The main chamber 720 will, for example, have a diameter of 1 mm. With the first layer 71 lying above and with the third layer 73 lying below, the side walls of a second hole delimit a secondary chamber or reservoir 722 whose purpose will be explained below. This secondary chamber 722 will, for example, have a diameter equal to 2 mm.

The third layer 73 consists of a sheet through which a U-shaped canal 730 is formed, each of whose ends opens into one of the chambers 720 and 722 of the second layer 72. This canal 730 consists of a channel 733, which is hollowed onto the face of the third layer 73 lying next to the fourth layer 74 and is covered by the fourth layer 74 of the microactuator 7. Each end of the channel 733 is extended perpendicularly by a conduit 731 and 732, each of the conduits 731 and 732 opening into a chamber 720 and 722 of the second layer 72 of the microactuator. This fourth layer 74 consists of a sealing film which covers the canal 730.

According to the invention, a pyrotechnic substance deposit 721 is produced on the upper surface of the third layer 73 in the main combustion chamber 720. This pyrotechnic substance deposit 721 therefore obstructs the conduit 731 of the canal 730 formed in the third layer 73. According to the invention it has been observed that with a deposit thickness which is sufficiently small but sufficient to generate the desired gas quantity, the combustion of the pyrotechnic material is limited to a small zone lying around the initiation point. For this reason, the same pyrotechnic substance deposit can be initiated at several separate places and at different times so that a gas quantity necessary to obtain a specific effect can be generated several times in the combustion chamber. Consequently, referring to FIG. 2, the pyrotechnic substance deposit 721 produced over all the surface of the upper face of the third layer 73 in the main combustion chamber 720 can, for example, be initiated at two separate places.

According to the invention, the initiation at two points or zones of the pyrotechnic substance deposit 721 may be carried out with the aid of different means. One of these means consists, for example, in using a resistive heating wire on which the pyrotechnic material is deposited. Another of these means consists, for example, in using initiation tracks deposited for example by screen printing on the upper face 734 of the third layer 73. The track then comprises a resistive part constituting an initiation zone through which the initiation takes place.

A microvalve as represented in FIG. 2 therefore operates in the following way. An electrical current is delivered through a resistive heating wire or a resistive part of a conductive track until the temperature reached is sufficient to ignite a first part of the pyrotechnic material deposit 721. According to the invention, the thickness of the deposit 721 being sufficiently small, the ignition of the deposit 721 remains localized and does not spread over all the pyrotechnic substance deposit 721. According to the invention, the deposit 721 is burnt over a zone other than that making it possible to obstruct the discharge canal 730, so that the gases produced stay in the main combustion chamber 720. The combustion of this first part of the pyrotechnic deposit 721 leads to gas production in the main combustion chamber 720, so as to create a positive pressure in this chamber 720. The positive pressure in the chamber 720 leads to deformation of the membrane 710. Deformation of the membrane 710, in response to the pressure of the gases, is possible only in the direction of the recess 752 formed in the fifth layer 75. The membrane will therefore deform until it is pressed against the bottom of the recess 752 and is thus interposed between the two canals 750 and 751 of the fluid microcircuit. The fluid microcircuit is therefore closed, and this closure is maintained owing to the pressure of the gases contained in the main chamber 720 on the deformable membrane 710. The pressure of the gases contained in the main chamber 720 is sufficient to press the membrane 710 against the bottom of the recess 752 and greater than the back-pressure exerted on the membrane 710 by the fluid contained in the microcircuit, so as to hold the membrane 710 against the bottom of the recess 752.

An unburnt second part of the pyrotechnic deposit 721 therefore still obstructs the conduit 731 of the canal 730 connecting the two chambers 720 and 722. Combustion of this second part of the pyrotechnic deposit 721, caused by initiation means of the type presented above i.e. a heating wire or the resistive part of a conductive initiation track, makes it possible to uncover the entry of the canal 730 connecting the two chambers 720 and 722. The secondary chamber 722 being at a pressure lower than the pressure prevailing in the main chamber 720, the gases generated by the combustion of the first part of the pyrotechnic deposit 721 and by the combustion of this second part of the deposit 721 obstructing the canal 730 can spread through the channel 730 into the secondary chamber 722. The volume of the secondary chamber 722 is sufficient to obtain a pressure of the gases between the two chambers 720, 722 which is less than the back-pressure exerted on the membrane 710 by the fluid contained in the microcircuit. During the expansion of the gases as a result of opening the canal, a sufficient reduction of the deformation of the membrane 710 is thus obtained in order to free the orifices formed by the canals 750, 751 of the fluid microcircuit. This deformation of the membrane 710 toward the outside of the recess 752 causes the valve to open, and the two canals 750 and 751 of the fluid microcircuit are therefore placed in communication.

According to an alternative embodiment, it would also be possible to purge the gases contained in the main chamber 720 directly out of the device by placing the main chamber 720 in communication with the free air. According to this variant, since all the gases are discharged from the main chamber 720, the membrane 710 returns to its initial position if it is elastic.

According to another embodiment, represented in FIG. 3, the pyrotechnic material 721' is deposited on all the surface of the upper face of the third layer 73. The pyrotechnic substance deposit 721' therefore constitutes an entire separate layer lying between the second layer 72 and the third layer 73. According to the invention, initiation is therefore possible at different points of this pyrotechnic layer. As described above, a first initiation makes it possible to deform the membrane 710 in one direction, while another initiation at the entry and at the exit of the canal makes it possible to discharge the gases to the secondary chamber 722 and deform the membrane 710 in the other direction. Lastly, initiation of another part of the pyrotechnic substance layer in a zone lying, for example, in the main combustion chamber 720 or the secondary chamber 722 makes it possible to obtain a new positive pressure in the main chamber 720 and the secondary chamber 722, and thus new deformation of the membrane 710. It is thus possible to produce a closing/opening/closing cycle of the fluid circuit.

A microsystem is a miniaturized multifunctional device whose maximum dimensions do not exceed a few millimeters. In the case of a fluid microcircuit, a microsystem may for example be a microvalve or a micropump and, in the scope of an electronic microcircuit, a microswitch or a microcommutator.

Referring to FIG. 4 a microsystem 1', for example in the form of a card, comprises a plurality of adjacent microactuators ($1a, \ldots, 1h$) identical to the one described with reference to FIG. 1. These microactuators ($1a, \ldots, 1h$) are all formed in the same support by stacking the three layers 10, 11, 12 defined above, i.e. a central layer 10 held between a membrane forming the upper layer 12 and a lower layer 11. The combustion chamber ($2a, \ldots, 2h$) of each of these microactuators ($1a, \ldots, 1h$) is therefore delimited by the side walls of a hole formed through the central layer 10 and by the upper layer 12 forming the deformable membrane lying above and the lower layer 11 lying below.

According to the invention, in contrast to the microactuator presented in FIG. 1, a pyrotechnic micro-charge is not deposited in each of the combustion chambers ($2a, \ldots, 2h$) of the microactuators ($1a, \ldots, 1h$). According to the invention, the pyrotechnic substance deposit 13 making it possible to inflate the membrane 12 at each of the microactuators ($1a, \ldots, 1h$) is common to all the microactuators ($1a, \ldots, 1h$). According to the invention, such a pyrotechnic deposit 13 represents a single layer 13 lying between the central layer 10 and the lower layer 11. According to the invention, given that the combustion of the deposit 13 is localized and does not propagate to all of the deposit 13, the initiation can therefore be carried out at different points of the layer and at different times. By using the same pyrotechnic substance layer 13 common to all the microactuators ($1a, \ldots, 1h$), it is equally well possible to actuate each of the microactuators ($1a, \ldots, 1h$). To this end, the thickness of the pyrotechnic substance deposit 13 must be sufficiently small in order to prevent the combustion in a combustion chamber ($2a, \ldots, 2h$) of a microactuator (1a, ..., 1h) from propagating beyond a certain zone, and causing pressurization of the combustion chamber of an adjacent microactuator. The combustion of the deposit must not therefore propagate beyond the combustion chamber (2a, ..., 2h) of the microactuator which has been activated.

The microsystem 1' represented in FIG. 4 uses, for example, a particular initiation device comprising a plurality of identical conductive fingers (6a, ..., 6h) standing mutually parallel and perpendicularly to a plane defined on a support element 9. Each of these fingers (6a, ..., 6h) is mounted on a spring (7a, ..., 7h) and electrically connected to a control center 8. The axes of the springs (7a, ..., 7h) are mutually parallel and perpendicular to the plane defined on the support element 9. The fingers (6a, ..., 6h) are electrically connected in parallel to one terminal of a current source 4 of the control center 8. The center 8 controls a plurality of switches (5a, ..., 5h), each conductive finger (6a, ..., 6h) being associated with one of these switches (5a, ..., 5h). By closing certain switches (5a, ..., 5h), the control center 8 can thus select the microactuators (1a, ..., 1h) to be activated. The control center 8 therefore comprises selection means allowing it to select the switches to be closed, as a function of the microactuators (1a, ..., 1h) which it is necessary to activate. According to the invention, the support element 9 is fitted onto the microsystem 1' so that a conductive finger (6a, ..., 6h) is associated with each microactuator (1a, ..., 1h) of the microsystem 1'. When the support element 9 is fitted onto the microsystem 1', the conductive fingers (6a, ..., 6h) are respectively kept in contact with the lower layer 11 of the microsystem 1' with the aid of their spring (7a, ..., 7h). The conductive fingers (6a, ..., 6h) are placed on the support element 9 so that each comes in contact with the lower face 111 of the lower layer 11, just below the combustion chamber (2a, ..., 2h) of a microactuator (1a, ..., 1h). The support element 9 comprises, for example, a peripheral ring 90 allowing it to be fitted onto the microsystem 1'. Assembly between the two elements is carried out along the arrows represented in FIG. 4, for example, and connection between the microsystem 1' and the support element 9 may be carried out for example by snap-fastening.

According to the invention, the control center 8 may be integrated with the support element 9 so as to constitute a complete initiation device which can be fitted on to the microsystem 1'.

According to the invention, the lower layer 11 is an electrically conductive layer. The pyrotechnic substance layer 13 is deposited on the upper face 110 of the conductive lower layer. When it is selected by the control center 8, each conductive finger (6a, ..., 6h) in contact with the conductive lower layer 11 makes it possible to create localized heating of the conductive lower layer 11 and cause initiation of the part of the pyrotechnic substance deposit 13 lying just above the finger, so that point deformation of the upper layer 12 forming the membrane is thus obtained at the selected microactuator (1a, ..., 1h) under the action of the combustion gases.

According to the invention, the presence of the side walls of a combustion chamber (2a, ..., 2h, 720) in the various embodiments described above can promote extinguishing of the deposit 13 around the initiation zone and make it possible to avoid propagation of the combustion of the deposit to the adjacent combustion chambers (2a, ..., 2h, 722).

The pyrotechnic substance deposit made only in the main combustion chamber 720 (721, FIG. 2) or made as a complete layer (721', FIG. 3 or 13, FIG. 4) may be produced with a thickness of less than 100 μm. The thickness of the deposit 721, 721', 13 must be sufficiently small in order to prevent the combustion from propagating beyond a limited zone lying around the initiation zone. However, this thickness of the deposit 721, 721', 13 must be sufficient to generate the gas quantity necessary for obtaining the desired effect. The gas quantity generated furthermore depends in particular on the energetic power of the pyrotechnic material being used, as well as on the geometry of the initiation device. The gas quantity released is therefore controlled by adjusting the thickness of the pyrotechnic substance deposit, the nature of the pyrotechnic material being used as well as the geometry of the initiation device. The greater the energetic power of the material is, the more the deposit thickness can be reduced. It is moreover possible to initiate a greater or lesser surface of the pyrotechnic substance deposit depending on the geometry of the initiation device, which makes it possible to generate more or less gas.

The pyrotechnic material used for the deposit may be a nitrocellulose-based varnish. In this case, the thickness of the deposit for making a microactuator of the type in FIG. 1 or 2 operate may be between 5 and 40 μm, and preferably between 10 and 20 μm.

According to the invention, the deposition as a layer on all of a support may be carried out by various techniques such as, for example, coating, screen printing, pad printing, immersion or spraying. In particular, nitrocellulose-based varnishes have film-forming properties which are highly suitable for coating on a specific support.

According to the invention, in the case of FIG. 3 or FIG. 4, the pyrotechnic substance layer 721', 13 may have an adhesive function by which assembly between the layer 72, 10 lying above and the layer 73, 11 lying below can be carried out or facilitated.

The invention claimed is:

1. A pyrotechnic microsystem comprising a substrate having at least two separate electrical initiation zones of a pyrotechnic material deposited on the substrate for ignition by at least one initiator, wherein the same pyrotechnic material deposit covers both initiation zones, said deposit having a thickness sufficiently small for the initiation of the pyrotechnic material at one initiation zone to remain localized and self-extinguishing and not propagate to the other initiation zone, but sufficient to generate a specific gas quantity.

2. The microsystem as claimed in claim 1, wherein the pyrotechnic material deposit has a thickness of less than 100 μm.

3. The microsystem as claimed in claim 1, wherein the substrate comprises an assembly of superimposed layers.

4. The microsystem as claimed in claim 3, wherein the pyrotechnic material deposit constitutes one of the superimposed layers.

5. The microsystem as claimed in claim 4, wherein the pyrotechnic material deposit is an adhesive between a layer lying above said deposit and a layer lying below said deposit.

6. The microsystem as claimed in claim 3, comprising a deformable membrane partially delimiting a combustion chamber to receive gases generated by at least one part of the pyrotechnic material deposit in contact with one of the initiation zones.

7. The microsystem as claimed in claim 6, comprising a layer through which an orifice forming the combustion chamber is formed, said layer being between the membrane, itself forming a layer, and the pyrotechnic substance deposit.

8. The microsystem as claimed in claim 1, wherein the deposited pyrotechnic material is in the form of a nitrocellulose-based varnish.

9. The microsystem as claimed in claim 8, wherein the varnish has a thickness of between 5 and 40 μm after drying.

10. The microsystem as claimed in claim 1, wherein each of the initiation zones can be initiated by an electrical resistance on the substrate.

11. The micro system as claimed in claim 1, wherein each of the initiation zones can be produced at the point of contact of a conductive finger, connected to an electrical generator on the substrate, and wherein the substrate is made of metallic substance, which is also connected to said generator.

12. The micro system as claimed in claim 1, comprising at least one microactuator on said substrate.

13. The microsystem as claimed in claim 12, wherein said microactuator comprises a chamber covered by a deformable membrane.

14. The microsystem as claimed in claim 12, comprising a plurality of microactuators on said substrate.

15. A method for fabricating a microsystem comprising a plurality of adjacent microactuators established on a substrate, each microactuator being capable of having a specific effect owing to the gases generated by the combustion of a pyrotechnic material initiated from an electrical initiation zone associated with each microactuator, the method comprising: depositing a pyrotechnic material layer common to all the microactuators on the substrate with a thickness sufficiently small for the initiation of the pyrotechnic substance in one initiation zone to remain localized and not propagate to the other initiation zone, but sufficient to generate a specific gas quantity.

16. The method as claimed in claim 15, consisting of stacking superimposed layers, the pyrotechnic material layer constituting one of the layers of the stack.

17. The method as claimed in claim 15, wherein the pyrotechnic material layer is deposited with a thickness of less than 100 μm.

18. The method as claimed in claim 15, wherein the pyrotechnic material layer is deposited by coating, screen printing, pad printing, immersion or spraying.

* * * * *